Sept. 4, 1934.  R. W. COUSINS  1,972,679
SAFETY DEVICE FOR HOT METAL MIXERS
Filed May 31, 1932  4 Sheets-Sheet 1
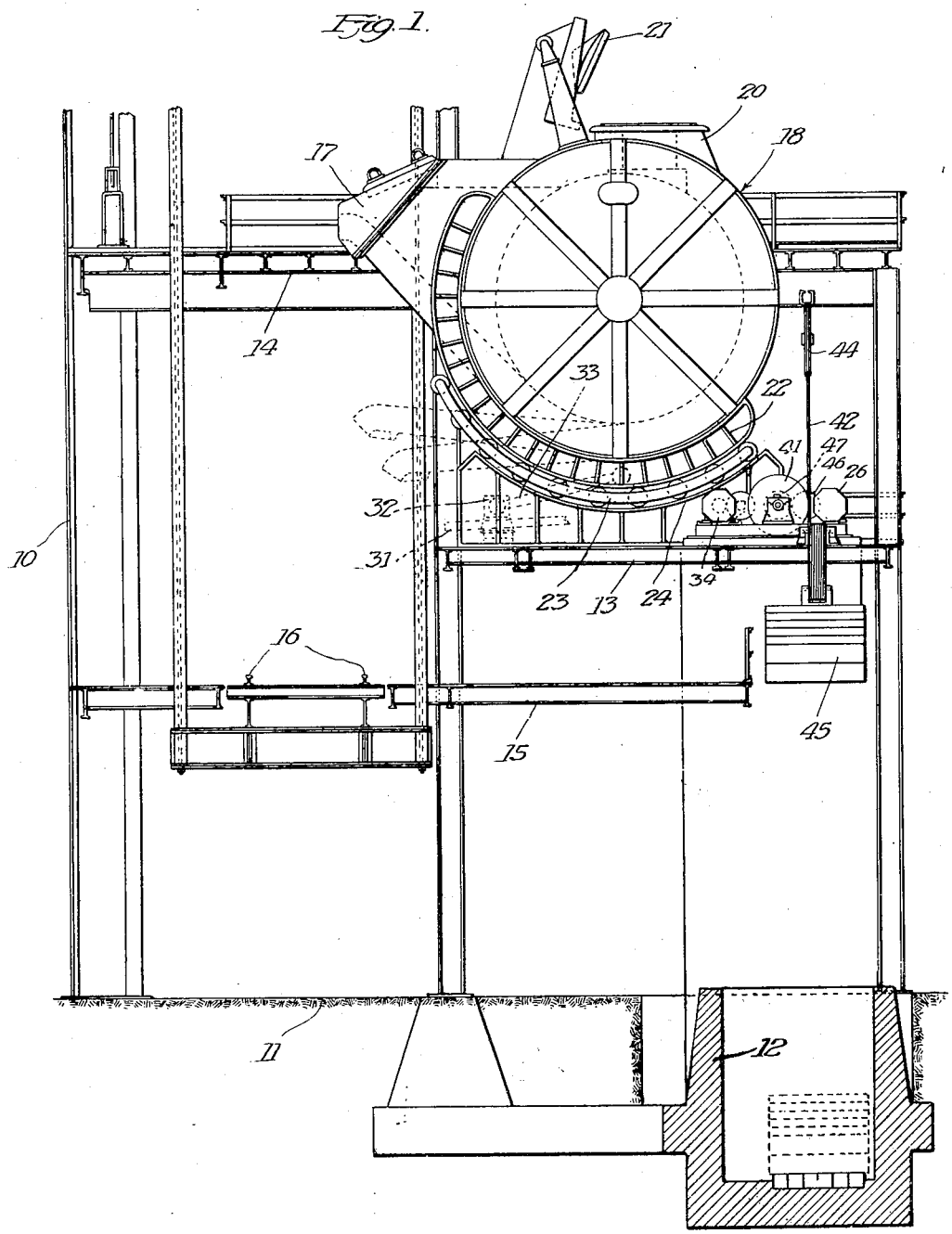
Inventor
Robert W. Cousins

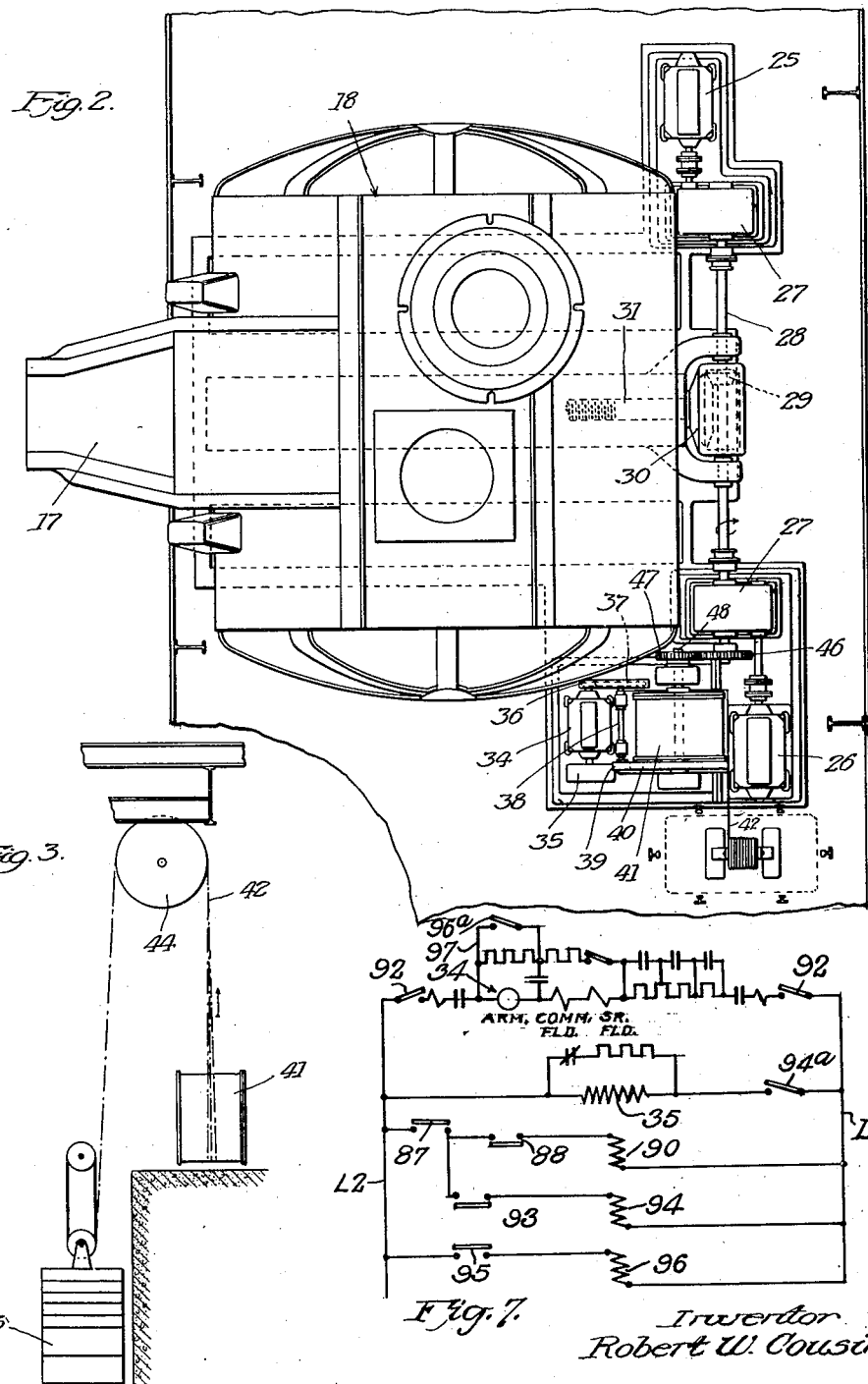

Sept. 4, 1934.  R. W. COUSINS  1,972,679
SAFETY DEVICE FOR HOT METAL MIXERS
Filed May 31, 1932  4 Sheets-Sheet 3

Witness
R B Davison

Inventor
Robert W. Cousins
By Maina and Rauber
Attys.

Sept. 4, 1934.  R. W. COUSINS  1,972,679
SAFETY DEVICE FOR HOT METAL MIXERS
Filed May 31, 1932  4 Sheets—Sheet 4
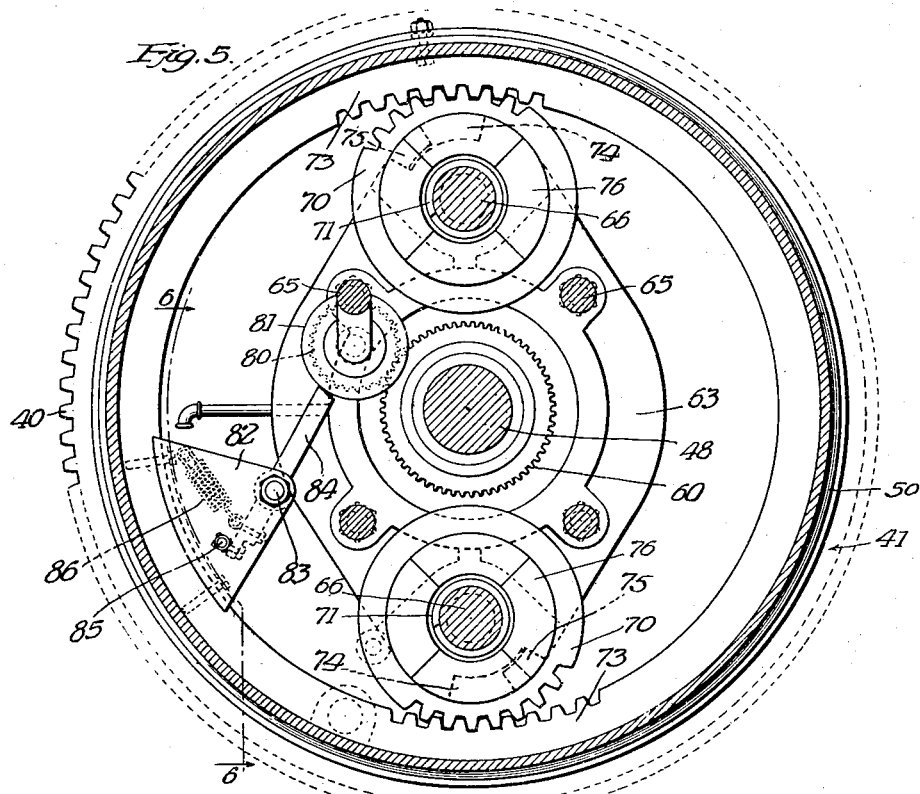
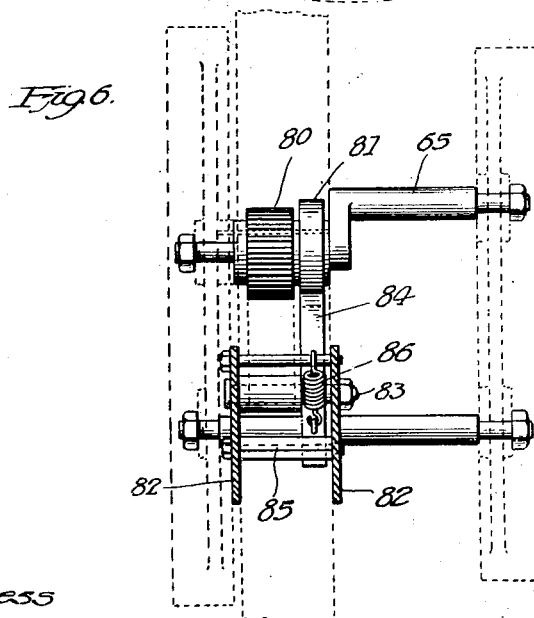

Patented Sept. 4, 1934

1,972,679

UNITED STATES PATENT OFFICE 1,972,679

SAFETY DEVICE FOR HOT METAL MIXERS

Robert W. Cousins, Gary, Ind.

Application May 31, 1932, Serial No. 614,569

22 Claims. (Cl. 266—39)

The invention relates to safety return devices for electrically operated vessels containing a liquid which is tapped out at intervals in desired quantities.

While the present invention particularly applies to mixers used in the steel industry for storing in a liquid condition iron made in blast furnaces and later used in foundries or in steel producing plants where it is refined, it has a much broader application, having utility not only in connection with storage containers for molten metal but also when applied to mixers for liquids either hot or cold or of corrosive qualities, the spilling of which will endanger the lives of the operators or be destructive to property.

There are devices in use in steel plants for the purpose of automatically righting a vessel in case of failure of power or in case the operator should inadvertently leave or in some manner lose control of the operating mechanism during the time the vessel is tilted for pouring, the righting of the vessel serving to return the same to an upright position and shut off the liquid being poured. Such devices apply an independent source of power from the one ordinarily operating the vessel such as electricity, compressed air or hydraulic power, which normally is not functioning but being held inoperative by means such as a treadle or switch on which the operator is standing. If the operator should therefore leave his position or if electric power supplied to the vessel tilting mechanism fails then the device will raise the vessel and stop the pouring, provided that the auxiliary driving power is functioning, which is not always the case. Frequent tests are required to see that the apparatus is in operating condition and it frequently happens that such tests are neglected as they can not be undertaken during operation every time the vessel is tilted.

It is easily understood that any such device as above outlined is not entirely automatic nor reliable. To make a righting device function at all times it must depend on power that can never fail, which must be a part of the vessel tilting mechanism itself, in such a manner that it must be used every time the vessel is operated so that if for any reason the safety device becomes inoperative the vessel can not be lowered.

An object of the invention, therefore, is the provision of means for righting a mixer as described which will utilize the energy stored in a suspended weight since the power thus derived is the safest of all as the force of gravity is constant, is not influenced by outside conditions and can never fail.

Another object is the provision of counterweight means for automatically returning a mixer to a position substantially upright in the event of power failure or failure of the usual operating means for other reasons. It is contemplated that a separate electric motor be used for hoisting the weight with electric control means, preventing usual operation of the mixer until the weight is in raised position. This feature makes certain that the counter-weight is in raised position before usual operation of the mixer takes place and thus guards against carelessness and other human factors.

A further object of the invention is to provide clutch mechanism for location within the hoisting drum for the counter-weight which will automatically interlock the drum with the mixer operating means when the drum is rotated by the fall of the counter-weight, allowing, however, normal operation of the mixer through its driving motors when the counter-weight is held in raised position.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a side elevational view of an installation comprising a mixer for storing and mixing molten metal, the same including equipment for righting the mixer constructed in accordance with the present invention;

Figure 2 is a top plan view of the arrangement shown in Figure 1, more particularly illustrating the drive for the mixer and the association therewith of the counter-weight righting means of the present invention;

Figure 3 is a fragmentary elevational view showing the manner of connecting the hoisting drum with the counter-weight;

Figure 5 is a transverse sectional view taken substantially on the plane indicated by line 5—5 of Figure 4, Figure 6 is a detail sectional view taken along the plane indicated by line 6—6 of Figure 5 and showing toggle brake means for the rotatable spider arms, and Figure 7 is a diagrammatic representation of the electric circuit for the hoisting motor including the various control means therefor.

Figure 4:
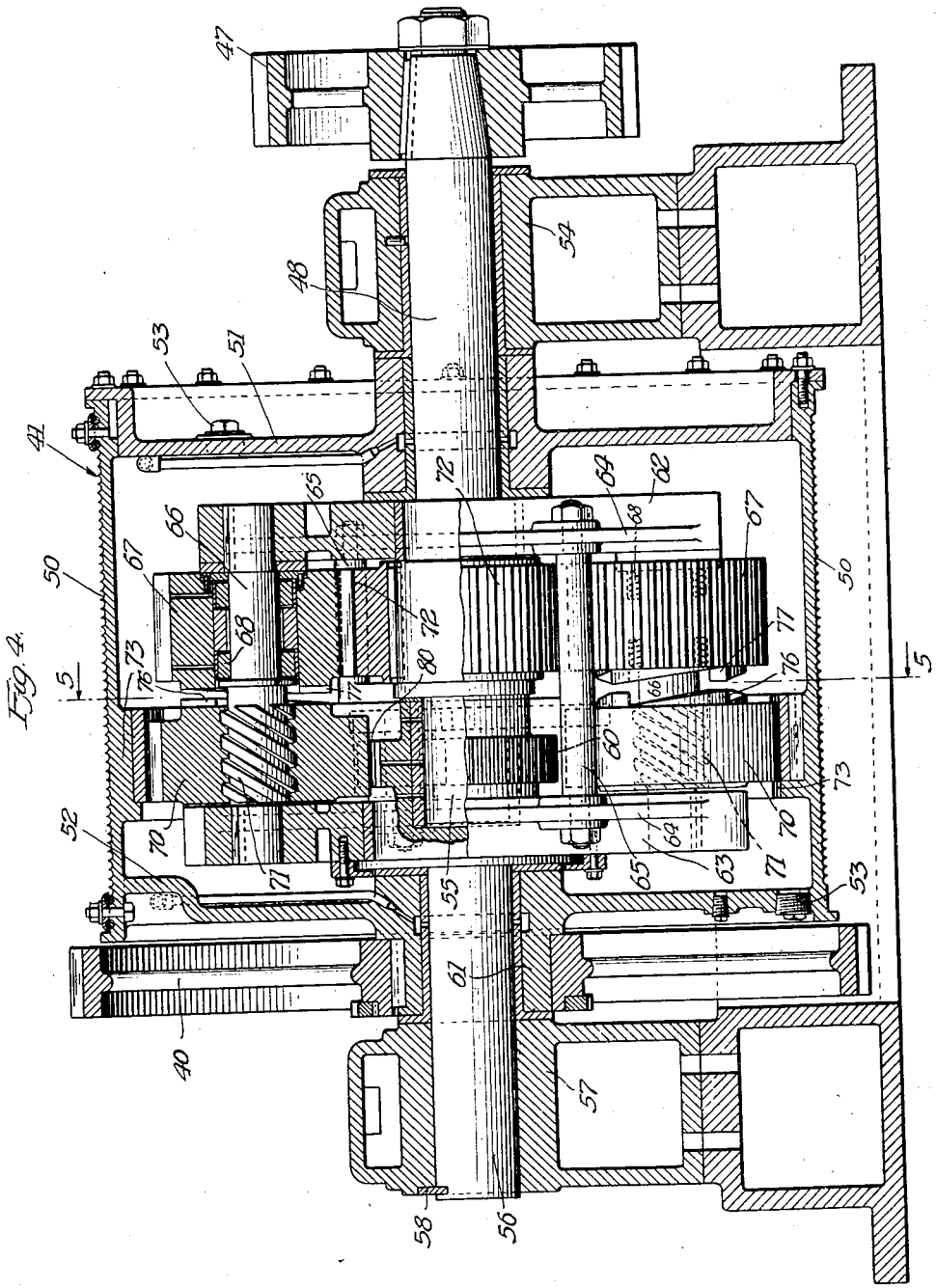
Figure 4 is a longitudinal sectional view taken substantially through the center of the hoisting drum and showing the construction of clutch housed within.

For illustrating the present invention the same is shown applied to a typical installation of mixer for mixing and storing molten metal although other liquids such as those of a corrosive nature may be stored in the mixer.

In Figure 1, 10 indicates the housing structure for the installation being located upon foundation 11, the latter provided with a sunken receptacle or well 12 and having located above supporting beams 13 for the mixer and its operating mechanism, supporting beams 14 for the operator and control parts, while below are located supporting platforms 15 and 15a, the latter having tracks 16 on which run the cars or receptacles for receiving the liquid poured from the spout 17 of the mixer designated in its entirety by 18.

The form of mixer disclosed is provided, in addition to the spout 17, with the top opening 20, having closure member 21 and a semi-circular track 22, the latter engaging sets of rollers 23 mounted on the arcuate supporting structure 24, whereby the mixer has rotation, permitting raising and lowering of the spout 17 from a position substantially horizontal to a lowered position indicated by dotted lines in Figure 1, whereby the liquid will be poured from the mixer to any suitable receptacle on track 16 positioned to receive the same. Located on the supporting structure 13 is the electric driving mechanism for causing the usual raising and lowering operations of the mixer including the reversible driving motors 25, 26, respectively, connecting by speed reducing means 27 with the operating shaft 28. Bevel gears 29 on shaft 28 mesh with bevel gear 30 on the threaded shaft 31, the latter comprising an elongated screw and having threaded engagement with the cross-head 32 which through link 33 has connection with the mixer. Closing of the circuit to the electric motors 25 and 26 will impart rotation in the desired direction to shaft 28 which will in turn drive the screw 31, reciprocating the cross head and rocking the mixer in a direction depending on the direction of rotation of the driving motors. In this manner the mixer is rotated from its upright position shown in Figure 1 to a lowered position where pouring of the contained liquid will take place. To terminate the pouring operation it is only necessary to cause reverse rotation of the driving motors to return the mixer to its initial upright position.

Associated with the usual motors 25 and 26 is an auxiliary motor 34 having solenoid brake 35 on one end of its rotor shaft and pinion 36 on its other end for meshing with and driving gear 37, which through its counter-shaft 38 and pinion 39 drives gear 40 connected with the hoisting drum 41. Attached to and wound upon the periphery of drum 41 is cable 42, Figure 3, which passes over a sheave pulley 44 suitably suspended from the upper supporting structure and has connection with the counter-weight 45. The hoisting motor 34 may be a uni-directional motor having rotation to cause the drum 41 to wind the cable, raising counter-weight 45. The motor shaft may be locked by means of the solenoid brake 35 upon the hoisting of the counter-weight to raised position and as long as the solenoid is electrically energized the drum will be held against rotation, maintaining the weight raised.

In order that rotation of the drum 41 through the counter-weight will serve to cause righting of the mixer, the driving motors 25 and 26 have operative connection with the drum through a one to one gear ratio, comprising pinion 46 extending from the speed reducing means 27 and pinion 47 on shaft 48 of the drum. Operations of the driving motors 25 and 26 for rotating the mixer for accomplishing the usual pouring operations can take place and although such operation will serve to rotate pinions 46 and 47 and consequently shaft 48 of the drum no rotation of the drum is caused thereby as connection between the shaft and the drum is effected by means of clutch structure to be described.

The drum 41, Figure 4, is provided on its periphery with a plurality of grooves 50 for receiving the cable 42 wound thereon and includes circular end members 51 and 52 which form the interior of the drum into a compartment sealed by plugs 53 so as to contain a quantity of oil for lubricating the clutch structure within. Shaft 48 having the pinion 47 keyed thereto at its outer end is rotatably mounted in support 54 and extends through end member 51, being rotatable with respect to the end member and terminates at 55. Shaft 56 forms a continuation of shaft 48 and is mounted in support 57, being keyed thereto by 58 and passing through the end member 52 of the drum in a manner whereby the drum may rotate independently of the shaft. The inner end is provided with a socket for receiving end 55 of shaft 48 so that the socket in effect provides a bearing for the end of the rotatable shaft. Formed on the periphery of the socket is a gear 60, the utility of which will be later explained. End 52 of the drum has formed thereon a hub 61 by means of which the member is mounted for rotation on the stationary shaft 56 with the hub having suitably keyed thereto the gear 40 which, as will be clearly understood from the above, functions to rotate the drum, the rotation serving to wind upon the periphery of the drum the cable 42.

The function of the clutch structure is to permit rotations of shaft 48, caused by the driving motors 25 and 26, to take place independently of the drum 41, and rotations of the drum for winding the cable thereon to take place independently of the shaft. However, when the drum rotates by reason of the fall of the counter-weight the invention contemplates that the power thus derived be automatically imparted through the driving connections to the mixer and this is also accomplished by the clutch structure which interlocks the drum when thus rotated with the shaft 48. The clutch more particularly includes a spider having arms 62 and 63 rotatably mounted on the stationary shaft 56, each of the arms being provided with webs 64 receiving a plurality of connecting bolts 65, by means of which the arms are maintained in connected relation. The arms carry at their ends, Figures 4 and 5, shafts 66 keyed to prevent their rotation and providing supporting means for the pinions 67, rotatably mounted on the shaft through roller bearings 68 and pinions 70 which latter pinions, however, have threaded engagement with the shafts by means of the threads 71 formed thereon. Each of the pinions 67 have meshing engagement with the pinion 72 mounted on and suitably keyed to the rotating shaft 48, while each of the pinions 70 is provided with gear teeth on a portion of its periphery for meshing with the gear ring 73 located internally of the drum. The structure contemplates that pinions 70 have limited rotation on their shafts 66 and for definitely limiting their movement to an arc of substantially forty-five degrees maximum the spider arm 63 is provided with slots 74, while the pinions have lugs 75 fitting in the slots, respectively. The opposite sides of each of the pinions 70 are provided with clutch teeth 76 for engaging with co-operating teeth 77 on the adjacent pinion 67. It will be clear from the above that normally the clutch teeth will be out of engagement and that to cause engagement of the same it will be necessary to impart to the pinion 70 that direction of rotation which will cause the pinions, by reason of their threaded engagement, to travel outwardly toward their adjacent pinion 67 on the shaft 66.

In order to understand the operation of the device as far as described it will be assumed that the drum 41 has been rotated by energization of hoisting motor 34 so as to raise the counter-weight to its upper position and that the solenoid brake 35 has been automatically connected in circuit through suitable electrical control means to hold the motor and thus the drum against rotation. Upon the completion of these operations the invention contemplates that the electrical control means will automatically connect the main driving motors 25 and 26 across the power lines with the result that the operator through manipulation of suitable switches can cause actuation of the motors to impart the desired rotations to the mixer for accomplishing the pouring of the liquid such as molten iron from the spout 17. Operation of the driving motors will in turn operate gear 46 and pinion 47, causing rotation of shaft 48 and pinion 72 keyed thereto and located within the drum. This pinion has meshing engagement with pinion 67 carried by the spider arms and therefore these also rotate, the spider arms, however, remaining stationary. If for any reason the electric power to the main driving motors should fail or the operator should accidentally leave his position, thus automatically opening a switch, it will be understood that the solenoid brake 35 will be de-energized to release the holding on the drum 41 which maintained the counter-weight in raised position. A more complete explanation of the automatic control of the hoisting motor and solenoid brake will be given with reference to the wiring diagram of Figure 7.

Accordingly, fall of the counter-weight will take place to rotate the drum 41 in a clockwise direction, rotating the pinion 70 also in a clockwise direction, which direction of rotation will result in travel of the pinions 70 on their shafts 66, in a direction toward their adjacent pinions 67. Engagement of the clutch teeth on the pinions will correspondingly take place whereby the drum through the pinions 70 and 67 will be locked to the spider arms, and since pinions 67, which are thus held against rotation, have meshing engagement with gear 72 on shaft 48, it follows that the drum is likewise locked to the shaft. Any further rotation of the drum through the fall of the counter-weight will therefore rotate shaft 48 and through the connecting gearing will function to actuate the mixer. The structure has been so designed to impart that direction of rotation to the operating shaft 28 of the mixer upon fall of the counter-weight to cause actuation of the mixer to right itself. Thus the spout 17 will be automatically raised a distance which may vary according to different designs but which will in all instances be sufficient to discontinue the flow of metal from the mixer. For raising the counter-weight again to its upper position the hoisting motor is suitably energized, rotating the drum 41 in a counter-clockwise direction. With the spider arms remaining stationary this rotation of the drum will serve to rotate pinion 70 in a direction such as to cause the pinions to travel on their shafts to release their clutching engagement with pinions 67. Their extended rotation is, however, limited by slots 74 and the pinion 75 so that further hoisting of the counter-weight will interlock the drum with the spider arms carrying the arms therewith. However, the pinions 67 are free to rotate and as shaft 48 remains stationary these pinions merely rotate on gear 72.

Normal operation of the driving motors will rotate shaft 48 and through gear 72 rotation will be imparted to pinions 67 carried by the spider arms. It has been found that such operation causes chattering of the spider arms as they have a tendency to creep or rotate by reason of the rotations of gear 72. For providing a positive stop to hold the spider arms but which will allow rotation of the arms along with the drum when the parts are interlocked for raising the counter-weight the structure contemplates employing one of the securing bolts 65 as journalling means for a pinion 80 having formed integrally therewith a roller 81 mounted concentrically on the shaft. The roller and pinion are rotated through meshing engagement between the pinion and gear 60 on the stationary shaft 56. Suitably secured to the inner periphery of drum 41 are spaced plates 82 for pivotally supporting by bolts 83 the toggle pin 84 which engages at one end with roller 81 and at its other end the stop 85 carried by the plates 82. The pin is resiliently held by coil spring 86 in extended position where the outer end contacts with the roller 81. Any rotation of the spider arms in a counter-clockwise direction, Figure 5, will serve to rotate the roller and also to force the roller into firm bearing engagement with the toggle pin 84.

In all electrical hook-ups such as contemplated with respect to the present driving motors and the independent hoisting motor it is customary to employ a foot switch, as the same may be termed, upon which the operator stands, and thus before any operation of the mechanism can be secured it is necessary that the operator be in a position where he will have full view of the pouring operations. The present electrical hook-up in addition to the above also includes suitable mechanism which will prevent operation of the driving motors even though the master switch is closed, unless the counter-weight is in raised position. When this operation has been completed the solenoid brake is automatically energized with the result that the motor and drum are locked, holding the counter-weight in raised position. With the apparatus electrically connected, as above described, it will be appreciated that the same is automatic in most of its actions and that in case of trouble such as failure of the power supply, the operator has nothing to attend to. It may be desired in some installations to check the rapidity of the fall of the counter-weight since a heavy weight when interlocked with the normal driving connections will be apt to place a strain on the connections sufficient to cause damage such as the stripping of the gears and the like. Accordingly, the electrical connections to the hoisting motor may be such as to provide a dynamic brake, cushioning the fall of the counter-weight but allowing uniform and steady descent of the same. This structure will now be described.

For purposes of description it will be assumed that the counter-weight is in lowered position and that the foot switch 87 and master switch 88 are open, as shown in Figure 7. The operator to raise the counter-weight stands on the foot switch to close the same and closes the master switch by hand. The circuit is closed between power lines L1 and L2 and the relay 90 is energized, which through suitable connections results in the opening of the dynamic braking switch 90a. This switch is included in a resistance circuit 91 shunted across the armature terminals of the hoisting motor 34 and which shunt circuit is automatically opened as described upon the closing of the foot switch and master switch. Energization of the relay 90 further operates to close the switches 92 which completes the circuit to the hoisting motor 34, causing operation of the motor and resulting in a raising of the counter-weight. When the counter-weight assumes its raised position it operates an upper limit switch 93, energizing relay 94, which relay in turn causes actuation of the switch 94a to close the switch and energizes solenoid brake 35. With energization of the solenoid brake the switches 92 are caused to open and remain open as long as energization continues so that the motor comes to rest and is held stationary by the brake, with the counter-weight in raised position. The parts will remain as described as long as the operator maintains the foot switch closed and power is supplied by the lines.

Should the foot switch open or in the event the power supply should fail the relay 93 would become deenergized, opening switch 93a, releasing the solenoid brake to allow the counter-weight to fall. The relay 90 would also become deenergized to close the switch in the shunt circuit with the result that as the armature rotates, due to the fall of the counter-weight, the closed shunt circuit will cause the motor to operate as a series generator, with the result that the fall of the counter-weight in doing the work necessary to rotate the armature serves to brake the fall of the counter-weight. Before the weight reaches its bottom limit, limit switch 95 is actuated, closing the circuit and energizing relay 96. This relay is suitably connected to actuate the switch 96a, closing circuit 97, shunting a portion of the resistance 91, thereby automatically increasing the current and output of the generator. As more power is required now to turn the armature a decided brake is given to the fall of the counter-weight, with the result that the same comes to a gradual stop, preventing damage.

I claim:

1. A safety device for a tilting type molten metal vessel, in combination, reversible electric driving means for oscillating the vessel to accomplish pouring and to right the vessel to terminate the pouring operation, auxiliary power in the form of a suspended weight, means automatically actuated by the fall of the weight to cause righting of the vessel, and electric means connected in circuit with said electric driving means for holding said weight suspended, whereby said electric means is energized to maintain the weight in elevated position during the time current is supplied to said driving means.

2. A safety device for a tilting type molten metal vessel, in combination, reversible electric driving means for oscillating the vessel to accomplish pouring and to right the vessel to terminate the pouring operation, auxiliary power in the form of a suspended counter-weight, electric brake means connected in circuit with said electric driving means for maintaining the weight in elevated position, said brake means being actuated to release the counter-weight upon failure of the electric current to said driving means, and means automatically actuated by the fall of the counter-weight to cause righting of the vessel.

3. In a safety device for mixers of the kind described, in combination with reversible electric driving means for oscillating the mixer to accomplish pouring and to right the mixer to terminate the pouring operation, of auxiliary power in the form of a counter-weight, a hoisting drum therefor, connections from the drum to the mixer, said connections being normally disengaged but being operative to right the mixer upon rotation of the drum by the fall of the counter-weight, and electric control means operating automatically to release the counter-weight upon failure of the energization of the main driving means, whereby the mixer is righted.

4. In a safety device for mixers of the kind described, in combination with reversible electric driving means for oscillating the mixer to accomplish pouring and to right the mixer to terminate the pouring operation, of auxiliary power in the form of a counter-weight, a hoisting drum therefor, connections from the drum to the mixer, said connections being normally disengaged but being operative to right the mixer upon rotation of the drum by the fall of the counter-weight, electric control means for maintaining the weight in raised position, said control operating automatically to release the counter-weight upon failure of the energization of the main driving means, whereby the mixer is righted.

5. A safety return device for mixers of the kind described, in combination, a plurality of electric driving motors for normal operation in rotating the mixer for pouring, a hoisting drum, a counter-weight connected by cable to the drum, electric control means for maintaining the counter-weight in raised position, said control operating automatically to release the weight upon failure of the main driving means, and connections from the drum to the mixer, the connections including part of the driving means for the drum and having association with the drum through clutch mechanism.

6. A safety return device for a tilting type molten metal vessel, comprising reversible electric driving motors for normal operation to oscillate the vessel for pouring and for righting the vessel to terminate the pouring operation, a counter-weight, a hoisting drum therefor, an electric hoisting motor operatively connecting with said drum for rotating the same to raise the counter-weight, connections from the drum to said vessel, said connections being normally disengaged but being operated to right the vessel upon rotation of the drum by the fall of the counter-weight, electrically energized means in circuit with said driving motors for maintaining the counter-weight in raised position, and electric control means operating to release the weight upon failure of the supply of electric power to the driving means during a pouring operation.

7. A safety return device for mixers of the kind described, comprising electric driving motors for normal operation in rotating the mixer for pouring purposes, a hoisting drum, a suspended counter-weight connecting with the drum, connections from the drum to a hoisting motor and from the drum to the mixer, one of the connections including a clutch housed in the drum, and electric control means operating to release the weight upon failure of the supply of electric power to the driving means, whereby the rotation of the drum by the fall of the weight serves to right the mixer.

8. A safety return device for mixers of the kind described, comprising electric driving motors for normal operation in rotating the mixer for pouring purposes, a hoisting drum, a suspended counter-weight connecting with the drum, connections from the drum to a hoisting motor and from the drum to the mixer, the latter connections comprising a clutch housed in the drum to permit actuation of the driving motors independently of the drum, and electric control means operating to release the weight upon failure of the supply of electric power to the driving means, whereby the rotation of the drum by the fall of the weight serves to right the mixer.

9. A safety return device for mixers of the kind described, comprising electric driving motors for normal operation in rotating the mixer for pouring purposes, a hoisting drum, a suspended counter-weight connecting with the drum, connections from the drum to a hoisting motor and from the drum to the mixer, the latter connections comprising a clutch housed in the drum and means whereby actuation of the driving motors will take place independently of the drum, and rotation of the drum upon the fall of the weight will drive the mixer.

10. A safety return device for mixers of the kind described, comprising electric driving motors connected to the mixer for rotating the same for pouring purposes, a hoisting drum, a suspended counter-weight connecting with the drum, a hoisting motor for rotating the drum to raise the weight, an electric brake holding the motor locked when the weight is in raised position so long as the driving motors are energized, and electric control means operating to release the weight upon failure of the supply of electric power to the driving means, whereby the rotation of the drum by the fall of the weight serves to right the mixer.

11. A safety return device for mixers of the kind described, comprising electric driving motors connected to the mixer for rotating the same for pouring purposes, a hoisting drum, a suspended counter-weight connecting with the drum, a hoisting motor for rotating the drum to raise the weight, an electric brake holding the motor locked when the weight is in raised position so long as the driving motors are energized, connections from the drum to the mixer including a clutch housed in the drum to permit actuation of the driving motors independently of the drum, and electric control means operating to release the weight upon failure of the supply of electric power to the driving means, whereby the rotation of the drum by the fall of the weight serves to right the mixer.

12. A safety return device for mixers of the kind described, comprising electric driving means for normal operation of the mixer, a counter-weight and hoisting drum therefor for actuating the mixer to right the same when the driving means fail, a hoisting motor for rotating the drum to raise the weight, and connections from the drum to the mixer including clutch structure housed in the drum, whereby the driving means operates independently of the drum but rotation of the drum by the fall of the weight will actuate the mixer.

13. A safety return device for mixers of the kind described, comprising electric driving means for normal operation of the mixer, a counter-weight and hoisting drum therefor for actuating the mixer to right the same when the driving means fail, a hoisting motor directly geared to the drum, and connections between the driving means and the drum, said connections including a rotatable shaft for the drum, and clutch means within and operating to lock the drum and shaft upon rotation of the drum by the fall of the weight.

14. A safety return device for mixers of the kind described, comprising electric driving means for normal operation of the mixer, a counter-weight and hoisting drum therefor for actuating the mixer to right the same when the driving means fail, a hoisting motor directly geared to the drum, and connections between the driving means and drum including a rotatable shaft for the drum, spider arms on the shaft carrying pinions having clutching engagement with each other, and means on the interior of the drum meshing with certain pinions, whereby the driving means operates independently of the drum but rotation of the drum by the fall of the weight will actuate the mixer.

15. A safety return device for mixers of the kind described, comprising electric driving means for normal operation of the mixer, a counter-weight and hoisting drum therefor for actuating the mixer to right the same when the driving means fail, a hoisting motor for rotating the drum to raise the weight, electric braking means for holding the drum with the weight in raised position, and electrical connections operating to dynamically brake the hoisting motor during fall of the counter-weight.

16. A safety return device for mixers of the kind described, comprising electric driving means for normal operation of the mixer, a suspended counterweight, a hoisting drum for the counterweight, a hoisting motor for rotating the drum to raise the weight, connections from the drum to the mixer including a shaft rotatably mounted and forming mounting means for the drum, a pinion keyed to the shaft within the drum, and means providing a clutch connecting the pinion with the drum whereby the shaft may rotate independently of the drum but rotation of the drum by the fall of the counterweight will actuate the mixer.

17. A safety return device for mixers of the kind described, comprising electric driving means for normal operation of the mixer, a suspended counterweight, a hoisting drum for the counterweight, a hoisting motor for rotating the drum to raise the weight, mounting means for the drum including a stationary shaft and a rotatable shaft, each shaft terminating interiorly of the drum, and a clutch within the drum forming connections between the drum and rotatable shaft, whereby the drum and rotatable shaft may be locked upon rotation of the drum by the fall of the weight.

18. A safety return device for mixers of the kind described, comprising electric driving means for normal operation of the mixer, a suspended counterweight, a hoisting drum for the counterweight, a hoisting motor for rotating the drum to raise the weight, mounting means for the drum including a stationary shaft and a rotatable shaft, each shaft terminating interiorly of the drum, a gear rotatable on the stationary shaft for connecting the drum and its hoisting motor, a pinion keyed to the rotating shaft and being operatively connected to the driving motors, and a clutch within the drum forming connections between the drum and rotatable shaft whereby the drum and rotatable shaft may be locked upon rotation of the drum by the fall of the weight.

19. A safety return device for mixers of the kind described, comprising electric driving means for normal operation of the mixer, a suspended counterweight, a hoisting drum for the counterweight, mounting means for the drum including a stationary shaft and a rotatable shaft, each shaft terminating interiorly of the drum, means connecting the rotatable shaft with the driving motors, spiders rotatable on the rotatable and stationary shafts, respectively, and having shafts connecting the arms of the spiders, and pinions on the spider shafts forming clutch means between the drum and the rotatable shaft whereby the drum and rotatable shaft may be locked upon rotation of the drum by the fall of the weight.

20. A safety return device for mixers of the kind described, comprising electric driving means for normal operation of the mixer, a suspended counterweight, a hoisting drum for the counterweight, connections from the drum to the driving means, said connections including a clutch within the drum to operatively connect the drum and mixer only upon a certain direction of rotation of the drum, and said drum and counterweight being connected to give the drum a direction of rotation to cause operation of the mixer when the counterweight falls.

21. A safety return device for mixers of the kind described, comprising electric driving means for normal operation of the mixer, a suspended counterweight, a hoisting drum for the counterweight, connections from the drum to the driving means, said connections including a clutch within the drum to operatively connect the drum and mixer only upon a certain direction of rotation of the drum, and a hoisting motor for the drum to rotate the drum independently of the main driving connections for the mixer in order to raise the counterweight, the drum having a direction of rotation to cause operation of the mixer when the counterweight falls.

22. A safety return device for mixers of the kind described, comprising electric driving means for normal operation of the mixer, a suspended counterweight, a hoisting drum for the counterweight, connections from the drum to the driving means, said connections including a clutch within the drum to operatively connect the drum and mixer only upon a certain direction of rotation of the drum, and a hoisting motor for the drum to rotate the drum independently of the main driving connections for the mixer in order to raise the counterweight, an electric brake for the hoisting motor to hold the motor locked when the weight is in raised position, said brake being included in the circuit connections to the electric driving means and being energized only when said electric driving means are energized, whereby release of said brake allows said drum to rotate by the fall of the counterweight and to cause righting of the mixer.

ROBERT W. COUSINS.